United States Patent [19]
Yokotsuka et al.

[11] 3,852,479

[45] Dec. 3, 1974

[54] PROCESS FOR PRODUCING A PROTEIN HYDROLYSATE

[75] Inventors: Tamotsu Yokotsuka, Nagareyama; Takashi Iwaasa; Mitsuharu Fujii, both of Noda, all of Japan

[73] Assignee: Kikkoman Shoyu Co., Ltd., Noda, Noda-shi, Japan

[22] Filed: Mar. 27, 1973

[21] Appl. No.: 345,455

Related U.S. Application Data
[63] Continuation-in-part of Ser. No. 102,878, Dec. 30, 1970, abandoned.

[52] U.S. Cl. ................. 426/44, 426/46, 426/52
[51] Int. Cl. ................................................. A23j 1/14
[58] Field of Search ................... 426/46, 52, 44

[56] References Cited
FOREIGN PATENTS OR APPLICATIONS
10,199    11/1958    Japan ..................... 426/44

OTHER PUBLICATIONS
Chem. Abstracts, Vol. 53, 4650b; 1959.

*Primary Examiner*—A. Louis Monacell
*Assistant Examiner*—Robert J. Warden
*Attorney, Agent, or Firm*—Cushman, Darby & Cushman

[57] ABSTRACT

A protein hydrolysate having a high glutamic acid content is produced by adding a glutaminase produced by such microorganisms as bacteria, yeasts, ray fungus, etc. to protein-containing materials when the protein is hydrolysed by a proteolytic enzyme and hydrolyzing the protein thereby to prevent glutamine liberated by proteolysis from conversion to pyroglutamic acid.

11 Claims, No Drawings

PROCESS FOR PRODUCING A PROTEIN HYDROLYSATE

CROSS REFERENCE TO RELATED APPLICATION

This application is a continuation-in-part application of our earlier copending application Ser. No. 102878, filed Dec. 30, 1970 now abandoned.

BACKGROUND OF THE INVENTION

1. Field of the Invention

This invention relates to a process for producing a protein hydrolysate having a particularly high glutamic acid content by hydrolyzing protein-containing raw material, and more particularly to a process for obtaining a protein hydrolysate having a particularly high glutamic acid content by adding a glutaminase together with a proteolytic enzyme to a protein-containing raw material or adding a glutaminase to a protein-containing raw material in the presence of a proteolytic enzyme and hydrolyzing the protein-containing raw material.

2. Description of the Prior Art

Heretofore, it has been a usual practice to carry out hydrolysis of protein by reacting a mineral acid such as hydrochloric acid with the protein in a heated state. According to the prior art method, the protein can be hydrolyzed to amino acids in a good efficiency, but the essential amino acids sensitive to the hydrochloric acid hydrolysis, for example, tryptophane, etc. are decomposed thereby. Furthermore, the amino acids sensitive to the hydrochloric acid, for example, methionine, cystine, etc., are partially decomposed, whereby substances having bad smells and bad tastes are formed. Furthermore, the carbohydrates always present in the vegetable proteins are more sensitive to the hydrochloric acid hydrolysis than the protein and thus undergo excessive decomposition, whereby substances having bad smells, such as levulinic acid, formic acid and oxalic acid, are formed. Therefore, the quality of the product is deteriorated with respect to the nutritive value as well as flavour and taste.

When the protein is hydrolyzed by the proteolytic enzymes, said unnecessary excessive decomposition can be avoided, whereby a product having a good quality and nutritive value can be obtained. However, in that case, the protein is hydrolyzed to amino acids in a poor efficiency, and as a result, the glutamic acid content of the hydrolysate is considerably small, as compared with that obtained by the hydrochloric acid hydrolysis. This is a disadvantage of the enzymatic hydrolysis process.

In the present specification, the term "protein hydrolysate" means a soy sauce, an amino acid solution or an amino acid-containing seasoning, or the like, the term "salt-resistant glutaminase" means a glutaminase having an activity even in a medium containing 10% or more sodium chloride, the term "heat-resistant glutaminase" means a glutaminase having an activity at 50°C or higher and the term "protein-containing raw material" means a protein rich substance originated from vegetables such as, for example, soybean, defatted soybean, wheat gluten and the like; a protein rich substance originated from animals such as, for example, meat, fishes, shellfish, milk and the like or extracts thereof; and a protein rich substance originated from microorganisms such as, for example, cells of yeast and the like.

According to one of the hydrolysis methods utilizing an enzyme, a protein-containing raw material to be hydrolyzed is subjected to a denaturation treatment such as heat treatment, etc., as in the conventional process for producing soy sauce, miso (fermented soybean paste), etc. and then inoculated with a microorganism capable of producing a proteolytic enzyme, such as Koji mould, and then admixed with a saline water or water to complete the protein hydrolysis. According to another method of the prior art, propagation of Koji mould mycelia is positively carried out in the hydrolysate of the raw material, as seen in a paste-like, salt-free moromi (mash). However, according to the fermentation method usually carried out, that is, the method comprising denaturing a raw material according to a proper denaturation procedure and adding to the denatured raw material a usually commercially available proteolytic enzyme preparation (a filtrate of submerged culture of Koji mould or an enzyme preparation prepared by separating the enzyme from the filtrate) to effect the protein hydrolysis, the glutamic acid content in the hydrolysate, or yield of the glutamic acid, is usually inferior to that obtained according to said methods. That is, the glutamic acid content per total nitrogen of the protein-containing raw material usually has the following values:

Glutamic acid/total nitrogen in protein hydrolysate

| | Hydrolysis method | Defatted soybean | Wheat gluten |
|---|---|---|---|
| I. | Hydrochloric acid hydrolysis method | 1.14 | 2.36 |
| II. | Fermented soy sauce method | 0.71 – 0.89 | 0.86 |
| III. | Hydrolysis by proteolytic enzyme | 0.56 – 0.69 | 0.47 |

The glutamic acid content is smaller in the method II than in the method I, because the glutamic acid in the raw material is liberated in the hydrolysate as glutamine and almost all of the glutamine is converted to pyroglutamic acid by non-enzymatic reaction [Nihon Nogei Kagaku Kaishi, Vol. 30, page 519, (1956)], or because the glutaminase, though present in Koji, has no salt resistance and its activity is inhibited thereby, and as a result the glutamine is converted not to glutamic acid, but to pyroglutamic acid (Japanese Pat. Publication No. 10199/58).

Further, yield of glutamic acid is smaller in the method III than in the method II, because the Koji mould mycelia propagated in the raw material accumulate glutamic acid within the mycelia and the accumulated glutamic acid is later released out of the mycelia by autolysis as free glutamic acid in the method II, whereby the glutamic acid content is enhanced in the hydrolysate [Hakko Kogaku Zashi, Vol. 40, page 532 (1962)].

Furthermore, M. Mogi shows in the Chemical Abstract, 53, 4650b, (1959), which corresponds to Japanese Pat. Publication No. 10199/58, a sauce and the process for preparing the sauce. The Mogi process comprises inoculating a mixture (of 660 ml of 7.5% sodium chloride and a yeast prepared from 550 g of soybean, 129 g of wheat and 66 g of soywheat) with glutaminase obtained from *Batiluss subtilis*. After 7 days, sodium chloride is added to the mixture to increase the sodium chloride concentration to 18%. The mixture is kept at 30°C for three months to produce a sauce containing 23.5 mg/ml of glutamic acid. However, according to the said corresponding Japanese Pat. Publication No. 10199/58, the term "yeast" is in error and should be "soy mash." Further, the present invention and said Japanese Patent Publication are quite different from each other in the idea of the invention. The process of Mogi comprises adding to the system at the initial stage of the fermentation of soy mash, an aqueous sodium chloride solution at a low concentration and glutaminase and, after a definite period of time has elapsed, successively adding the remaining sodium chloride. That is, the concentration of aqueous sodium chloride solution to be used at the initial stage is as low as 7.5%, and after a definite period of time has elapsed, the remaining sodium chloride is successively added to the system so as to increase the concentration of sodium chloride up to that of the conventional Moromi such as 18%. The reason for this is that in a concentrated aqueous sodium chloride solution, the action of glutaminase, which is added in order to convert the glutamine to glutamic acid, is greatly disturbed with the result that not only is glutamic acid not formed in a sufficiently large amount, but also the glutamine is quickly and easily decomposed to tasteless pyroglutamic acid.

In preparing Koji mash, however, the mash is contaminated with other infectious microbes, so that a deterioration of the product in quality cannot be avoided in many cases due to the formation of undesirable products produced by detrimental substances-producing microorganisms. It is to be noted that even a little difference in quality between foods has a large influence on the commercial value thereof.

Further, the Mogi process (Koji process) is carried out at the initial stage of fermentation in a low concentration of aqueous sodium chloride solution such as 7.5%, and after a definite period of time has elapsed, the remaining sodium chloride is successively added to the system, since the glutaminase used by him is not salt-resistant.

On the other hand, in the enzymatic method, which is generally carried out and comprises adding a commercial proteolytic enzyme preparation into a protein-containing raw material which is denaturated by a suitable method and hydrolyzing the protein contained in the raw material, the glutamic acid content or the ratio of glutamic acid to the total amino acid content is very low even though the deterioration of the product in quality by infectious microbes is avoided as compared with the above-mentioned Mogi process (Koji method).

One object of the present invention is to provide and improvement in the above-mentioned enzymatic method. That is, the present invention in this aspect relates to a process for producing a protein hydrolyzate having a high glutamic acid content by hydrolyzing a protein-containing raw material, which was subjected to a denaturing treatment such as heat treatment, in the presence of a proteolytic enzyme and glutaminase by means of a one-step process, characterized in that the proteolytic enzyme to be used is in a pure form, and hydrolysis of the protein contained in the raw material is carried out in a closed system without contaminating with other infectious microbes and thus differing from the Koji method, so that a product having a high glutamic acid content can be produced by a one-step process even in the absence of sodium chloride without deterioration of the product in quality due to infectious microbes.

A second object of the present invention is to provide a one-step process for carrying out the protein hydrolysis at a high temperature in the absence of sodium chloride or in the presence of a low concentration thereof by using heat-resistant glutaminase and propeolytic enzyme without deterioration of the product in quality.

A third object of the present invention is to provide a process for carrying out the protein hydrolysis with a concentrated sodium chloride aqueous solution, such as 10% or more, by using a salt-resistant glutaminase and proteolytic enzyme in a one-step process.

As stated above, Mogi teaches a process for producing a soy sauce, which comprises a three-step process including (1) inoculating a Koji-mould capable of producing a proteolytic enzyme into a protein-containing raw material which was subjected to heat-treatment to produce a soy mash, (2) adding glutaminase and a saline water having a low concentration, e.g. 7.5%, into the resulting soy mash and fermenting the soy mash for one week to produce glutamic acid, and (3) thereafter adding the remaining sodium chloride to make the concentration thereof up to the desired high concentration and further subjecting the resulting mixture to fermentation and aging to obtain a soy sauce having a high glutamic acid content.

In contrast the present invention provides a process for producing a protein hydrolyzate having a high glutamic acid content in a one-step process, which comprises adding a glutaminase together with a proteolytic enzyme to a protein-containing raw material, which was subjected to denaturing treatment such as a heat-treatment, and hydrolyzing the protein contained in the raw material either in the absence or presence of sodium chloride. That is, the present process is characterized in that the hydrolysis of protein can be carried out in a one-step process without using such apparatus and complicated steps as required in the Koji (Mogi) method and deteriorating the product in quality by the contamination of infectious microbes. In the present process there is used glutaminase in the absence or presence of sodium chloride, and if required, a heat-resistant glutaminase is used to carry out the hydrolysis at a higher temperature than that of the conventional process either in the absence or presence of a low concentration of sodium chloride, or a salt-resistant glutaminase is used at a high concentration of sodium chloride to obtain a protein hydrolyzate having a high glutamic acid content and excellent in quality as compared with these prepared according to the conventional processes. Further, even though Mogi teaches the use of a glutaminase at 18% sodium chloride concentration and 30°C, which would appear to make it salt and heat-resistant, as can be seen from Japanese Pat. Publication No. 10199/58, Mogi also teaches that the action of glutaminase is greatly disturbed, in a concentrated aqueous sodium chloride solution, so that such low concentration as 7.5% of sodium chloride is used so as to make glutaminase act in the hydrolysis of protein, and after completion of the action of the glutaminase, the remaining sodium chloride is added to increase the concentration thereof up to 18%. The present invention is directed to three processes:

1. A process for producing a protein hydrolyzate having a high glutamic acid content by hydrolyzing a protein-containing raw material, which was subjected to a denaturing treatment such as heat treatment, in the presence of a proteolytic enzyme and glutaminase by means of a one-step process, characterized in that the proteolytic enzyme to be used is in a pure form, and hydrolysis of the protein contained in the raw material is carried out in a closed system without contaminating with other infectious microbes, thus differing from the Koji method, so that a product having a high glutamic acid content can be produced by a one-step process even in the absence of sodium chloride without deterioration of product in quality with infectious microbes.

2. A process for carrying out the protein hydrolysis at a high temperature in the absence of sodium chloride or in the presence of a low concentration thereof by using heat-resistant glutaminase and proteolytic enzyme without deterioration of the product in quality by a one-step process.

3. A process for carrying out the protein hydrolysis with a concentrated sodium chloride aqueous solution such as 10% or more by using a salt-resistant glutaminase and proteolytic enzyme by a one-step process.

In contrast to these procedures the process of Mogi comprises at the initial stage preparing a Koji from a protein-containing raw material such as soybeans, and glutaminase is added together with a low concentration of aqueous sodium chloride solution to the Koji and, after a definite period of time has elapsed to effect the fermentation of the system, the remaining sodium chloride is successively added to the system.

The following may be noted in regard to the present invention:

1. In cases where the aqueous medium contains no salt and the aqueous medium is kept at a room temperature, any glutaminases disclosed in the present specification can produce glutamic acid in high yield without producing undesired by-product.

2. In cases where the aqueous medium contains sodium chloride in high concentration, only salt-resistant glutaminases can be used as disclosed in the specification.

3. In cases where an aqueous medium is kept at a high temperature (50°C or more), only heat-resistant glutaminases can be used as disclosed in the specification.

If it is required to produce glutamic acid in high yield without producing undesirable by-product with this mixture of glutaminases independently of the salt concentration, a salt-resistant glutaminase should be contained in the said mixture.

SUMMARY OF THE INVENTION

As a result of various studies, the present inventors have found that the reason that the glutamic acid content is smaller in the method III than in the method II is that there is a very small amount of glutaminase in the reaction system. That is, the proteolytic enzyme preparation heretofore employed contain no glutaminase or a very small amount of glutaminase, and consequently the glutamine liberated is converted not to glutamic acid, but to pyroglutamic acid. For example, when the production of proteolytic enzyme is carried out by a Koji culture and a Koji extract solution is used as an enzyme preparation, only 2–5% of total glutaminase activity present in the Koji is extracted.

Further in the case of the liquid Koji culture, the glutaminase activity of the mycelia is about 1/5 to 1/10 of that of the Koji, and no activity is observed almost at all in the filtrate of the Koji culture.

Taking into consideration the foregoing observation and results, the present inventors succeeded in converting glutamine liberated from the raw material by hydrolysis to glutamic acid without any conversion to pyroglutamic acid, by adding a glutaminase of a microorganism, which is extracted from the cells or is brought into a state workable upon the glutamine at least outside the cells, to the proteolytic enzyme. That is to say, the present invention is to provide a process for hydrolysis of protein, characterized by adding glutaminase together with a proteolytic enzyme to a protein-containing raw material and hydrolyzing the raw material by parallel action of the proteolytic enzyme and the glutaminase.

According to the present invention, the ratio of glutamic acid to the total nitrogen in the protein hydrolysate is higher than those of the methods II and III, as shown below:

| | Hydrolysis method | Defatted soybean | Wheat gluten |
|---|---|---|---|
| IV | Hydrolysis by adding glutaminase to Koji in the fermented soy sauce method | (A) 0.89 | (A) 0.85 |
| | | (B) 1.15 | (B) 1.44 |
| V | Hydrolysis by adding glutaminase to proteolytic enzyme preparation | (A) 1.23 | (A) 2.15 |
| | | (B) 1.28 | (B) 2.11 |

(A): Koji mould glutaminase was used.
(B): *Escherichia coli* glutaminase was used.

The present invention is epoch-making in that the such a conventional concept that the glutamic acid yield is small in the enzymatic hydrolysis of protein is upset, and it is obvious that a utilization of the raw material can be effected to a high degree according to the present invention.

Any proteolytic enzyme of animal or vegetable origin or microorganism origin can be used in the present invention. Further, a culture of the micro-organism or a crude enzyme or purified enzyme obtained from a culture of these microorganisms can be also used in the present invention.

It is well known that there are the proteolytic enzymes in almost all microorganisms. For example, *Aspergillus sojae* (ATCC 20235), *Aspergillus saitoi* (ATCC 14332), *Bacillus badus* (FERM-P 543), *Thermopolyspora polyspora* (ATCC 21451), etc., are preferable strains. Commercially available enzyme preparations, for example, Pronase (a product made by Kaken Chemical Co., Ltd., Japan), etc. are produced from the ray fungus or purple mushroom, but are effectively utilized in the present invention.

As the proteolytic enzyme of vegetable origin, trypsin, papain, etc., can be also used in the present invention.

Koji prepared using said microorganisms according to the Koji method can be also used in the present invention.

Glutaminase of animal or vegetable origin can be used, but the utilization of a microorganism is industrially advantageous. Any microorganism capable of producing glutaminase can be used in the present invention. For example, bacteria, ray fungus, fungi imperfecti, ascomycetes, algae-like microorganisms, basidiomycetes, etc., which are capable of producing glutaminase, such as *Escherichia coli, Bacillus subtilis, Bacillus coagulans, Bacillus megaterium, Proteus vulgaris, Pseudomonas aeruginosa, Pseudomonas, ovalis, Pseudomonas fluorescens, Pseudomonas reptilivora, Pseudomonas schuylkilliensis, Clostidium perfringes, Staphilococcus aureus, Achromobacter liquefaciens, Bacterium succinicum, Serratia Marcescens, Cryptococcus albidus, Cryptococcus laurenti, Saccharomyces cerevisiae, Saccharomyces rouxii, Candida utilis, Streptomyces griseus, Streptomyces fradiae, Streptomyces globisporus, Aspergillus oryzae, Aspergillus sojae, Aspergillus awamori, Penicillium chrysogenum, Rhizopus oryzae*, etc., can be generally used in the present invention. Among these microorganisms, those which are capable of producing a large amount of glutaminase, are more advantageous in attaining the object of the present invention.

It is preferable to use a salt-resistant glutaminase when a soy sauce, an amino acid solution or an amino acid-containing seasoning is prepared by hydrolyzing protein by a proteolytic enzyme in the presence of 10% or more sodium chloride. As the microorganism capable of producing the salt-resistant glutaminase, for example, *Escherichia coli* B IAM 1268 (ATCC 11303), *Proteus vulgaris* IAM 1025, *Achromobacter liquefaciens* TR-9, *Bacterium succinicum* IAM 1017, *Pseudomonas fluorescens* IAM 1179, *Pseudomonas ovalis* R 962, *Pseudomonas schuylkilliensis* IAM 1154 NRRL B-6, *Bacillus megaterium* NRRL B-939, *Cryptococcus albidus* ATCC 20293, *Cryptococcus albidus* ATCC 20294, etc., can be mentioned among said microorganisms.

It is generally preferable to effect hydrolysis at 50°C or higher to prevent contamination by foreign microorganisms when a protein hydrolysate is produced by enzymatic hydrolysis of the protein. In such a case, use of a heat-resistant glutaminase is preferable. As the microorganisms capable of producing the heat-resistant glutaminase, such microorganisms as *Bacillus megaterium* NRRL B-939, *Pseudomonas ovalis* 3-5, *Pseudomonas reptilivora* S 1105, *Serratia marcescens* IAM 1184, *Achromobacter liquefaciens* TR-9, *Bacterium succinicum* IAM 1017, *Cryptococcus albidus* K-0434, ATCC 20294, etc. can be mentioned.

Further, the glutaminase produced by *Saccharomyces rouxii* ATCC 13356, *Streptomyces griseus* ATCC 10137, *Aspergillus sojae* IAM 2665, *Aspergillus awamori* ATCC 14335, etc., has a relatively low salt or heat resistance, but can be used satisfactorily in the present invention, depending upon the desired object of the present invention.

It is needless to say that a strain capable of producing a glutaminase having a good salt resistance and a heat resistance at the same time, such as *Achromobacter liquefaciens* TR-9, *Bacterium succinicum* IAM 1017, *Bacillus megaterium* NRRL B-939 and *Cryptococcus albidus* ATCC 20294, is effectively utilized in the present invention, depending upon the desired object of the present invention.

When the glutaminase produced by these microorganisms is used, a liquid medium is usually used and culturing is carried out according to the conventional method. The culturing can be carried out by state culture or by submerged culture. The ordinary substrates which the relevant microorganism can utilize, are used in the medium. That is to say, as a source of carbon, for example, bran, glucose, maltose, sucrose, dextrin, starch, etc. are used. As a source of nitrogen, defatted soybean, soybean powders, gluten, yeast extract, peptone, meat extract, cornsteep liquor, ammonium salts, nitrates, etc., are used alone or in a proper combination thereof. In addition, a very small amount of such salts of magnesium, calcium, potassium, sodium, phosphoric acid, iron, manganese, etc. is used, if required. Furthermore, a substance capable of serving as a substrate of glutaminase, such as L-glutamine, can be added to a medium containing such nutritional sources to cultivate the microorganism.

It is preferable to use the culture in a state of suspension obtained by applying such a treatment as trituration, etc., to the culture and then adding water or a solution of various salts thereto, or in a state of a filtrate of the culture or in a state of crude or purified extract enzyme. The cells obtained from the culture can be used as they are, or after the treatment with acetone or alcohol, or after the drying of the cells. For the extraction of the enzyme from the cells, the ordinary extraction methods can be widely utilized. For example, a crude enzyme solution obtained by applying an ultrasonic treatment, trituration, autolysis, etc., to the culture and adding an aqueous solution of salts such as a buffer solution to the thus treated culture to extract the enzyme, can be also used. Further, a purified enzyme obtained by applying to the crude enzyme a precipitation method by such a hydrophilic organic solvent as ethyl alcohol, acetone, etc., salting out by ammonium sulfate, etc., or dialysis, or adsorption and elution method by a cellulose ion exchanger or ion exchange resin in a suitable combination, can be also used.

In carrying out the present invention, the glutaminase thus obtained is added, together with a proteolytic enzyme preparation, to a raw material, which may be denatured properly if necessary, in a proportion of 100–1,000 units of protease and 50–1,000 units of glutaminase per gram of the raw material, and the glutaminase and protease thus added are allowed to react upon the raw material at the same time. In another way, a microorganism such as the Koji mould, for example, *Aspergillus oryzae*, or the like is inoculated into a raw material which may be denatured properly if necessary, and the culture thus obtained is added to a solid or liquid medium to make the glutaminase and protease act upon the medium at the same time.

In that case, the pH of the reaction system is 2.5–9.0, particularly 5.0–8.0. The reaction temperature is selected in such a range that the enzyme undergoes no deterioration or the enzymatic activity is not made very slow, but a reaction temperature of 30°–70°C is particularly preferable. The reaction time depends upon the raw material, the amount of enzyme, the reaction temperature, etc., but usually a reaction time of 10 hours to 120 days is sufficient.

DESCRIPTION OF THE PREFERRED EMBODIMENTS

The present invention will be explained in detail hereunder, referring to examples.

Example 1

To 10 g of defatted soybean was added 13 ml of potable water, and after the heat treatment, 500 mg of proteolytic enzyme preparation (a commercially available product of enzyme produced by *Aspergillus oryzae*, which was partially purified and made by Sigma Co.), 1 g of a glutaminase preparation (acetone powders of mycelia obtained by culturing *Aspergillus sojae* IAM 2665 in a Czapek's medium containing 1% L-glutamine and 0.5% glucose as a source of carbon at 30°C by shaking) and 50 ml. of potable water were added thereto. Further, a small amount of toluene was added thereto, and then the hydrolysis was carried out at 37°C for 7 days with shaking. As a control, the hydrolysis was carried out in the same manner as above, using only the proteolytic enzyme without the addition of the glutaminase. The ratio of free glutamic acid to soluble total nitrogen of the hydrolysate was 1.23 for the case that the glutaminase was added, and 0.69 for the case that no glutaminase was added. The amino acid solution thus obtained could be used as a seasoning or a raw material for others.

Example 2

Hydrolysis was carried out for 5 days in the same manner as in Example 1, except that 10 g of wheat gluten was used in place of 10 g of the defatted soybean. The ratio of free glutamic acid to soluble total nitrogen of the hydrolysate was 2.15 for the case that the glutaminase was added, and 0.47 for the case that no glutaminase was added.

Example 3

To 1 g of milk casein were added 50 mg of Pronase (a product made by Kaken Chemical Co., Ltd., Japan) as a proteolytic enzyme, 200 mg of acetone-dried powders of cells obtained by culturing *Pseudomonas schuylkilliensis* IAM 1154 (NRRL B-6) in a medium containing meat extract and peptone, as a glutaminase, 5 ml of water and a small amount of toluene. Hydrolysis was carried out at 37°C with shaking for 4 days. The ratio of free glutamic acid to soluble total nitrogen in the hydrolysate was 1.57 for the case that the glutaminase was added, and 1.01 for the case that no glutaminase was added.

Example 4

To 100 g of wheat gluten were added 500 ml of potable water and 300 mg of a proteolytic enzyme (dried precipitate obtained by culturing *Bacillus badius* FERM-P No. 543 and adding three volumes of ethyl alcohol to one volume of the culture filtrate), and hydrolysis was carried out at 65°C with shaking for 5 hours. The amount of amino acid-state nitrogen in the hydrolysate thus obtained was very small, and it was presumed that the most of the hydrolysate was in a peptide state. To the hydrolysate was added 1 g of acetone-dried cells obtained by culturing *Chryptococcus albidus* K-3566 (ATCC 20293), and reaction was carried out at 65°C by stirring for 1 hour. Then, the resulting solution was heated at 100°C for 5 minutes, cooled and filtered. To the filtrate was added 300 mg of a proteolytic enzyme of the Koji mould (dried precipitate obtained by adding 3 volumes of ethyl alcohol to one volume of water extract of Koji culture of *Aspergillus sojae*), and the hydrolysis was carried out at 50°C for 12 hours. As a control, the treatment and hydrolysis were carried out in the same manner as above without the addition of acetone-dried cells of *Chryptococcus albidus* K-3566 (ATCC 20293). The ratio of free glutamic acid to the total nitrogen of the hydrolysate was 1.58 for the case that the acetone-dried cells of *Chryptococcus albidus* were added, and 0.46 for the control. The amino acid solution thus obtained could be used as a seasoning or a raw material for others.

Example 5

To 100 g of defatted soybean was added 130 ml of potable water, and the resulting solution was heated. Then, 300 ml of potable water, 300 mg of a proteolytic enzyme (dried precipitate obtained by adding 3 volumes of ethyl alcohol to one volume of a filtrate of the culture of *Thermopolyspora polyspora* ATCC 21451), and 1 g of acetone-dried cells obtained by culturing *Chryptococcus laurenti* OUT 6028 were added thereto, and hydrolysis was carried out at 60°C by stirring for 10 hours. Then, the solution was heated at 100°C for 5 minutes, cooled and filtered. The amount of amino acid state nitrogen in the filtrate was very small. To the filtrate was added 300 mg of a proteolytic enzyme of the Koji mould used in Example 4, and the hydrolysis was carried out at 50°C by stirring for 12 hours. The ratio of free glutamic acid to the total nitrogen in the hydrolysate was 1.04 and 0.67 for the case that the hydrolysis was carried out in the same manner as above, except that no acetone-dried cells of the Chryptococcus were added thereto.

Example 6

To 50 g of fresh meat of saurels was added 50 ml of potable water, and the resulting solution was homogenized. Then, 60 ml of potable water, 200 mg of the proteolytic enzyme of the Koji mould used in Example 4, 1 g of acetone-dried cells obtained by culturing *Chryptococcus albidus* K-0434 (ATCC 20294), and further a small amount of toluene were added thereto, and the hydrolysis was carried out at 45°C by stirring for 12 hours. The ratio of free glutamic acid to the amino state nitrogen in the hydrolysate was 1.4, but 1.0 for the case no acetone-dried cells of Chryptococcus were added.

Example 7

To 1 kg of soy sauce koji prepared according to the conventional method was added 2 g of a salt-resistant glutaminase (crude enzyme extracted from the cells obtained by culturing *Pseudomonas ovalis* R 962 in a medium containing meat extract and peptone). Further, an aqueous sodium chloride solution was added thereto in the same manner as in the conventional method for preparing soy sauce to prepare a moromi, and after aging, the moromi was squeezed. The ratio of glutamic acid to the total nitrogen of the thus obtained filtrate was 1.02, but 0.85 for the case that no glutaminase was added.

Example 8

A moromi was prepared in the same manner as in the conventional method for preparing soy sauce, using 10 kg of soy sauce koji prepared according to the conventional method, 5 g of salt-resistant glutaminase (crude enzyme extracted from the cells obtained by culturing *Escherichia coli* B ATCC 11303) in addition of an aqueous sodium chloride solution, and after aging, the squeezing and pasteurization were carried out according to the conventional method. The ratio of glutamic acid to the total nitrogen in the thus obtained soy sauce was 1.13, 0.80 for the case that no glutaminase was added, and 0.83 for the case that no non-salt-resistant glutaminase was added.

Example 9

To 10 g of defatted soybean was added 13 ml of potable water, and after the heat treatment, 500 mg of a proteolytic enzyme (dried precipitate obtained by adding acetone to water extract of the bran koji of *Aspergillus sojae*) 1 g of a salt-resistant glutaminase (acetone-treated powders of cells obtained by culturing *Bacillus*

*megaterium* NRRL B-939) and 50 ml of potable water containing sodium chloride at 20% concentration were added thereto. The hydrolysis was carried out at 50°C by shaking for 2 days. The ratio of free glutamic acid to the total soluble nitrogen in the hydrolysate was 1.21, but 0.65 for the case that no glutaminase was added. The hydrolysate was filtered, and the filtrate was concentrated and spray dried, whereby a powder seasoning was obtained.

Example 10

To 10 g of wheat gluten was added 13 ml of potable water, and after the heat treatment, 500 mg of a proteolytic enzyme (a commercially available product produced by *Aspergillus oryzae* and partially purified, which was made by Sigma Company), 50 mg of a salt-resistant glutaminase (an enzyme extracted from cells obtained by culturing *Pseudomonas fluorescens* IAM 1179) and 50 ml of a 20% aqueous sodium chloride solution were added thereto. The hydrolysis was carried out at 30°C for 7 days. The ratio of free glutamic acid to the total soluble nitrogen in the hydrolysate was 2.15, but 0.47 for the case that no glutaminase was added. The hydrolysate was filtered, and various spices, or an extract of fish meat or chicken or cattle meat was added to the filtrate. When the resulting filtrate was concentrated, a seasoning having a good taste was obtained.

Example 11

To 100 g of defatted soybean was added 130 ml of potable water, and after the heat treatment, 2 g of the proteolytic enzyme obtained in the same manner as in Example 5, 1 g of a heat-resistant glutaminase (acetone-dried cells obtained by culturing *Serratia marcescens* IAM 1184) and 500 ml of potable water were added thereto. The hydrolysis was carried out at 60°C by shaking for 20 hours. The ratio of free glutamic acid to the total soluble nitrogen in the hydrolysate was 1.26, but 0.63 for the case that no glutaminase was added. After the hydrolysate was filtered, sodium chloride was added to the filtrate. When the resulting filtrate was concentrated and spray dried, a seasoning power was obtained.

Example 12

To 100 g of wheat gluten were added 250 ml of water, and then 2 g of a proteolytic enzyme produced by the Koji mould used in Example 4, and 1 g of a glutaminase (acetone-dried cells obtained by culturing *Pseudomonas reptilivora* S 1105) were added thereto. The hydrolysis was carried out at 55°C for 20 hours. The ratio of free glutamic acid to the total soluble nitrogen in the hydrolysate was 2.09, but 0.43 for the case that no glutaminase was added. The hydrolysate was filtered, and various spices, or an extract of fish meat or chicken or cattle meat was added to the filtrate. When the resulting filtrate was concentrated, a liquid seasoning having a good taste was obtained.

Example 13

To the hydrolysate obtained in the same manner as in Example 11 was added sodium chloride so as to make the solution having a 18% sodium chloride concentration, and then a soy sauce yeast and lactic acid bacteria were added thereto. The solution was kept at 30°C for 30 days by occasional stirring and then filtered. The resulting filtrate was pasteurized in the same manner as in the case of the ordinary soy sauce, whereby a liquid seasoning quite similar to soy sauce was obtained.

What is claimed is:

1. A process for producing a protein hydrolysate having a high glutamic acid content, which comprises adding a glutaminase together with a proteolytic enzyme to a salt free denatured protein-containing raw material and hydrolyzing in a closed system the protein contained in the raw material.

2. A process according to claim 1, wherein the glutaminase is a salt-resistant glutaminase.

3. A process according to claim 1, wherein the glutaminase is a heat-resistant glutaminase.

4. A process according to claim 1, wherein the proteolytic enzyme is a crude enzyme or purified enzyme of animal, vegetable or microorganism origin, or a culture of the microorganism produced by using a culture medium free of protein-containing raw material.

5. A process according to claim 1, wherein the hydrolysis is carried out at 30°–70°C.

6. A process according to claim 1, wherein the hydrolysis is carried out at a pH of 2.5–9.0.

7. A process for producing a protein hydrolysate having a high glutamic acid content, which comprises adding to a salt free denatured protein-containing raw material, cells, dried cells, filtrate of culture, crude enzyme, purified enzyme or a crude enzyme-containing solution containing glutaminase which is produced by culturing at least one microorganism capable of producing glutaminase selected from *Escherichia coli* B IAM 1268 (ATCC 11303), *Bacillus subtilis*, *Bacillus coagulans*, *Bacillus megaterium* NRRL B-939, *Proteus vulgaris* IAM 1025, *Pseudomonas aeruginosa*, *Pseudomonas ovalis* R-962, *Pseudomonas ovalis* 3-5, *Pseudomonas fluorescens* IAM 1179, *Pseudomonas reptilivora* S 1105, *Pseudomonas schuylkilliensis* IAM 1154 (NRRL B-6), *Clostidium perfringes*, *Staphilococcus aureus*, *Achromobacter liquefaciens* TR-9, *Bacterium succinicum* IAM 1017, *Serratia marcescens* IAM 1184, *Cryptococcus laurenti*, *Cryptococcus albidus* ATCC 20293, *Cryptococcus albidus* ATCC 20294, *Saccharomyces cerevisiae*, *Saccharomyces rouxii* ATCC 13356, *Candida utilis*, *Streptomyces griseus* ATCC 10137, *Streptomyces fradiae*, *Streptomyces globisporus*, *Aspergillus oryzae*, *Aspergillus sojae* IAM 2665, *Penicillium chrysogenum*, *Rhizopus oryzae* and *Aspergillus awamori* ATCC 14335, together with a proteolytic enzyme, and hydrolyzing in a closed system the protein contained in the raw material.

8. A process according to claim 7, wherein the hydrolysis is carried out at 30°–70°C.

9. A process according to claim 7, wherein the hydrolysis is carried out at a pH of 2.5–9.0.

10. A process for producing a protein hydrolysate having a high glutamic acid content, which comprises adding a heat-resistant glutaminase together with a proteolytic enzyme to a protein-containing raw material, or adding a heat-resistant glutaminase to a protein-containing denatured raw material in which a proteolytic enzyme is present and hydrolyzing in a closed system the protein contained in the raw material at a temperature of at least 50°C.

11. A process according to claim 10, wherein the heat-resistant glutaminase is one produced by culturing at least one microorganism capable of producing a heat-resistant glutaminase selected from the group consisting of *Bacillus megaterium* NRRL B-939, *Pseudomonas ovalis* 3-5, *Pseudomonas reptilivora* S 1105, *Serratia marcescens* IAM 1184, *Achromobacter liquefaciens* TR-9, *Bacterium succinicum* IAM 1017, *Cryptococcus albidus* K-0434, ATCC 20294.

* * * * *